United States Patent
Chun

(10) Patent No.: US 7,391,130 B2
(45) Date of Patent: Jun. 24, 2008

(54) SYSTEM FOR VARYING GROUNDING CONFIGURATION OF VEHICLE AUDIO AND VIDEO SYSTEM

(75) Inventor: Kyung-Taek Chun, Yongin-si (KR)

(73) Assignee: Hyundai Autonet Co., Ltd., Icheon-si (KR)

( * ) Notice: Subject to any disclaimer, the term of this patent is extended or adjusted under 35 U.S.C. 154(b) by 563 days.

(21) Appl. No.: 11/023,421

(22) Filed: Dec. 29, 2004

(65) Prior Publication Data

US 2006/0038446 A1 Feb. 23, 2006

(30) Foreign Application Priority Data

Aug. 17, 2004 (KR) ............... 10-2004-0064877

(51) Int. Cl.
*B60L 1/00* (2006.01)
*B60L 3/00* (2006.01)
*H02G 3/00* (2006.01)

(52) U.S. Cl. ............................................. 307/10.1
(58) Field of Classification Search ................. 307/10.1
See application file for complete search history.

(56) References Cited

U.S. PATENT DOCUMENTS 4,394,779 A * 7/1983 Hansen ............... 455/277.2
2002/0084910 A1 * 7/2002 Owens et al. ......... 340/825.24

* cited by examiner

*Primary Examiner*—Michael J Sherry
*Assistant Examiner*—Carlos Amaya
(74) *Attorney, Agent, or Firm*—Greenblum & Bernstein, P.L.C.

(57) ABSTRACT

A device to vary a grounding configuration of a vehicle audio and video (A/V) system is provided to prevent various electrical system noise in the vehicle. The system includes a controller that outputs a control signal to connect an A/V system chassis ground to a vehicle body ground or to open the A/V system chassis ground and the vehicle body ground according to the usage mode of the vehicle A/V system. A relay connects the A/V system chassis ground to the vehicle body ground or opens the A/V system chassis ground and the vehicle body ground in response to the control signal output from the controller.

5 Claims, 1 Drawing Sheet

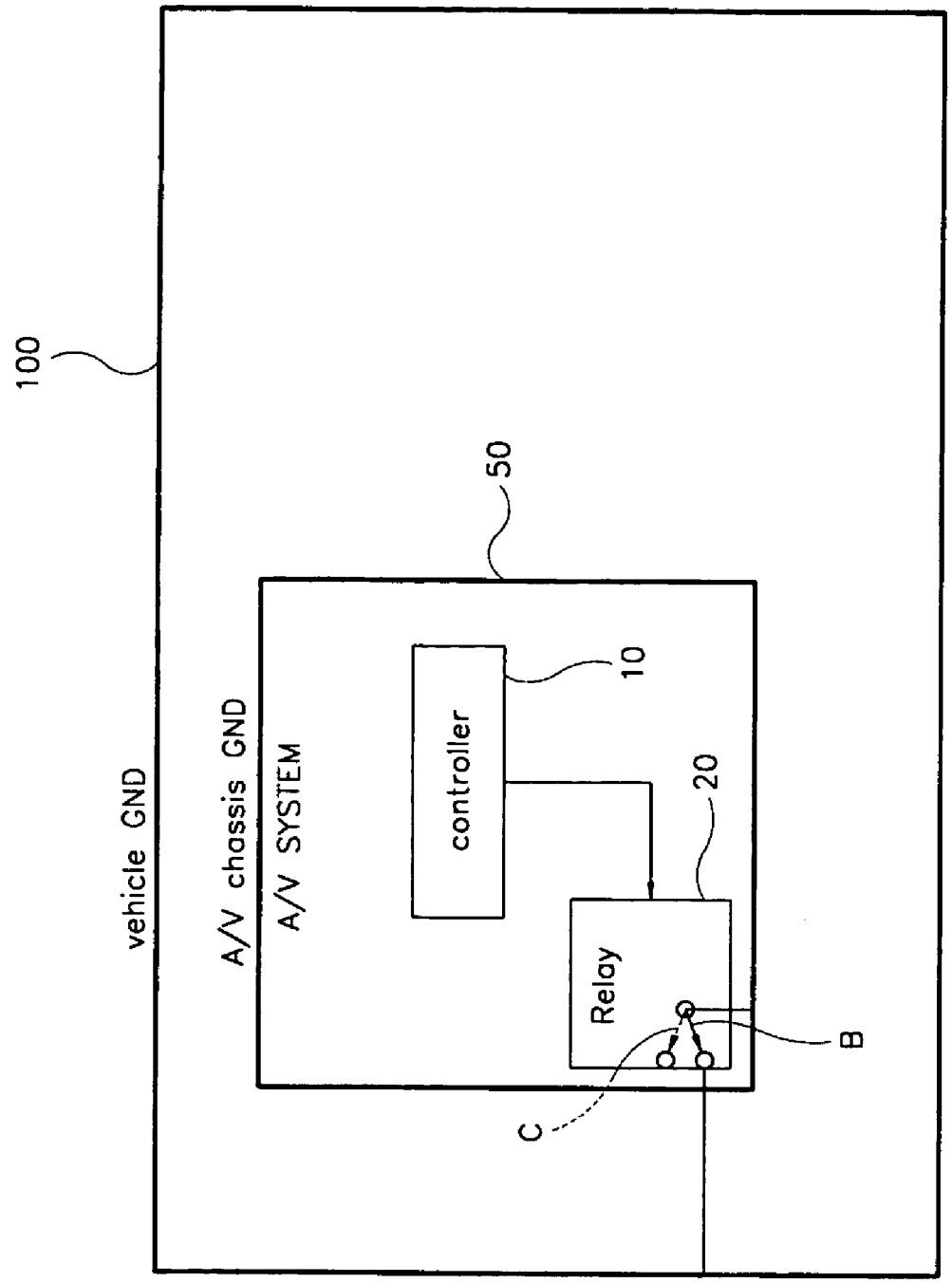

SYSTEM FOR VARYING GROUNDING CONFIGURATION OF VEHICLE AUDIO AND VIDEO SYSTEM

CROSS-REFERENCE TO RELATED APPLICATIONS

The present application is based on, and claims priority from, Korean Application Serial Number 10-2004-0064877, filed on Aug. 17, 2004, the disclosure of which is hereby incorporated by reference herein in its entirety.

FIELD OF THE INVENTION

The present invention relates to a device that varies a grounding configuration of a vehicle audio and video (A/V) system, and more particularly to a system whereby the ground of the vehicle A/V system connects to the vehicle body or is converted into a floating state.

BACKGROUND OF THE INVENTION

Generally, a chassis ground of a vehicle audio and video (A/V) system is used by connecting to a vehicle body ground or by converting into a floating state.

However, there is a drawback in the conventional grounding configuration of the vehicle A/V system in that if the chassis ground of the A/V system connects to the vehicle body ground, conductive noise is unavoidable, and if the chassis ground is floated without connecting to the vehicle body ground, radio noise is unavoidable.

SUMMARY OF THE INVENTION

An embodiment of the present invention is provided to prevent various electrical system noise of the vehicle by connecting the chassis ground of the audio and video (A/V) system to the vehicle body ground or converting the chassis ground into a floating state according to the usage mode of the vehicle A/V system.

A system for varying a grounding configuration of a vehicle A/V system includes a controller that outputs a control signal to connect an A/V system chassis ground to a vehicle body ground or to open the connection between the A/V system chassis ground and vehicle body ground according to the usage mode of the vehicle A/V system. A relay connects the A/V system chassis ground to the vehicle body ground or opens the connection between the A/V system chassis ground and vehicle body ground in response to the control signal output from the controller.

BRIEF DESCRIPTION OF THE DRAWINGS

For a better understanding of the nature and objects of the present invention, reference should be made to the following detailed description with the accompanying drawing, in which:

FIG. 1 is a schematic view of a system for varying a grounding configuration of a vehicle audio and video system according to an embodiment of the present invention.

DETAILED DESCRIPTION OF THE PREFERRED EMBODIMENTS

Referring to FIG. 1, a grounding form or configuration of a vehicle audio and video (A/V) system according to an embodiment of the present invention includes a controller 10 that receives a signal and outputs a control signal either to connect an A/V system chassis ground 50 to a vehicle body ground 100 or to open and maintain the A/V system chassis ground 50 in a floating state according to the usage mode of the vehicle A/V system. A relay 20 connects the A/V system chassis ground 50 to the vehicle body ground 100 or opens the connection between the A/V system chassis ground 50 and vehicle body ground 100 in response to the control signal output from the controller 10.

The operation of the system for varying a grounding configuration of the vehicle A/V system will now be described in detail with reference to the drawing.

When the A/V system chassis ground 50 connects with the vehicle body ground 100, electrical system noise (i.e. radio noise) is avoidable. Conductive noise is avoidable when the A/V system chassis ground 50 is in a floating state without being connected with the vehicle body ground 100.

The relay 20 according to the embodiment of the present invention operates according to the control of the controller 10 to connect the A/V system chassis ground 50 to the vehicle body ground 100 (state B) or to open and convert the A/V system chassis ground 50 into a floating state (state C), thereby coping with diverse electrical system noise in the vehicle.

The controller receives a signal and determines whether the vehicle A/V system is in amplitude modulation, frequency modulation, Digital Versatile Disk mode, or tape mode. If the controller 10 of the A/V system determines that the usage mode of the vehicle A/V system is in an amplitude modulation (AM) or frequency modulation (FM), the controller 10 controls the relay 20 to attach the A/V system chassis ground 50 to the vehicle body ground 100 (connection B) to prevent radio noise. If the usage mode of the A/V system is in a Digital Versatile Disk (DVD) or tape mode, the controller 10 controls the relay 20 to maintain the A/V system chassis ground 50 in a floating state (connection C), thus preventing conductive noise.

In the vehicle A/V system of the present invention, the ground is connected to the vehicle body or converted into a floating state for coping with various electrical system noise of the vehicle.

The technical concept of the present invention is not limited to the embodiment of the present invention, however, may be determined by a logical interpretation within the scope of accompanying claims.

As apparent from the foregoing, there is an advantage at least in that the A/V system chassis ground is either connected to the vehicle body ground or converted into a floating state according to the usage mode of the vehicle A/V system, contributing to a prevention of various electrical system noise in the vehicle.

What is claimed is:

1. A device to vary a grounding configuration of a vehicle audio and video (A/V) system, comprising:
   a vehicle body ground;
   an A/V system chassis ground configured to be connected to the vehicle body ground when the vehicle A/V system is in one of amplitude modulation mode and frequency modulation mode, the A/V system chassis ground configured to be disconnected to the vehicle body ground when the vehicle A/V system is in one of Digital Versatile Disk mode and tape mode;
   a controller that outputs a control signal to connect the A/V system chassis ground to the vehicle body ground or to open said A/V system chassis ground and said vehicle body ground according to the modes of the vehicle A/V system; and a relay that connects said A/V system chassis ground to said vehicle body ground or opens said A/V system chassis ground and said vehicle body ground in response to the control signal output from said controller.

2. The device according to claim 1, wherein said controller controls said relay to connect said A/V system chassis ground to said vehicle body ground, if the usage mode of the vehicle A/V system is in the amplitude modulation or frequency modulation mode, and to open said A/V system chassis ground and said vehicle body ground, if the mode of the A/V system is in the Digital Versatile Disk mode or tape mode.

3. The device according to claim 1, wherein said controller controls said relay to open said A/V system chassis ground and said vehicle body ground, if the mode of the AV system is in the Digital Versatile Disk mode or tape mode.

4. The device according to claim 1, wherein said controller controls said relay to connect said A/V system chassis ground to said vehicle body ground, if the mode of the vehicle A/V system is in the amplitude modulation mode or frequency modulation mode.

5. The device according to claim 1, wherein said controller controls said relay to connect said A/V system chassis ground to said vehicle body ground, if the controller determines that the mode of the vehicle A/V system is in the amplitude modulation mode or frequency modulation mode, and to open a connection between said A/V system chassis ground and said vehicle body ground, if the controller determines that the mode of the A/V system is in Digital Versatile Disk mode or tape mode.

* * * * *